United States Patent [19]
Chang et al.

[11] Patent Number: 5,392,336
[45] Date of Patent: Feb. 21, 1995

[54] DATA MESSAGE STORAGE AND PICK UP SERVICE

[75] Inventors: Edward S. Chang; Nadine K. Grasty, both of Warren; Alok K. Gupta, Marlboro; Bruce E. McNair, Holmdel; Alan I. Schwartz, Bedminster, all of N.J.

[73] Assignee: AT&T Corp., Murray Hill, N.J.

[21] Appl. No.: 68,359

[22] Filed: May 27, 1993

[51] Int. Cl.6 .......................................... H04M 11/00
[52] U.S. Cl. ..................... 379/93; 379/100; 379/102; 379/104; 379/105; 358/402; 358/403; 358/442; 358/404
[58] Field of Search ............ 379/100, 102, 104, 105, 379/89, 88, 113, 111, 112; 358/402, 403, 440, 442, 443, 444

[56] References Cited

U.S. PATENT DOCUMENTS

| | | | |
|---|---|---|---|
| 4,845,739 | 7/1989 | Katz | 379/93 |
| 4,935,955 | 6/1990 | Neudorfer | 379/100 |
| 5,072,309 | 12/1991 | Brown | 358/434 |
| 5,090,049 | 2/1992 | Chen | 379/100 |
| 5,128,984 | 7/1992 | Katz | 379/97 |
| 5,224,156 | 6/1993 | Fuller et al. | 379/100 |
| 5,257,112 | 10/1993 | Okada | 379/100 |
| 5,263,082 | 11/1993 | Kotake et al. | 379/89 |
| 5,291,302 | 3/1994 | Gordon et al. | 358/402 |

FOREIGN PATENT DOCUMENTS

0244933 9/1990 Japan ................... 358/402

Primary Examiner—Curtis Kuntz
Assistant Examiner—Stella L. Woo
Attorney, Agent, or Firm—Frederick B. Luludis

[57] ABSTRACT

A facility is provided which implements a "hold-for-pickup" function in the delivery of a data message, e.g., a facsimile. Particularly, the facility associates a data message that it receives from a sender with a respective confirmation number and sends the confirmation number to the sender. Thereafter, the facility transmits the message only to a receiver who enters the confirmation number when requested to do so. The facility also provides a number of other features, such as allowing the sender to specify the number of receivers that will receive the data message. Another feature associates a received data message with a plurality of confirmation numbers. In this way, a user may associate the confirmation numbers with respective receivers. The receivers may then obtain a copy of the sender's data message from the facility by entering their respective confirmation numbers when requested to do so.

41 Claims, 6 Drawing Sheets

| DATE STAMP (303) | | PIN (302) | | ANI (301) |
|---|---|---|---|---|
| STATUS (306) | | CNFMTEL (305) | | NOR (304) |
| CNFM N | ∘ ∘ ∘ (307-N) | CNFMN 2 (307-2) | | CNFMN 1 (307-1) |
| RECTEL N | ∘ ∘ ∘ (308-N) | RECTEL 2 (308-N) | | RECTEL 1 (308-1) |
| | | | | MEMADDR (309) |

| | A/C NO. (403) | PIN (402) | | NAME (401) |
|---|---|---|---|---|
| NOR (407) | FLG1 (406) | CNFMN 2 (405) | | ANI (404) |

| 501 | 502 |
|---|---|
| CNFMNx | AAA |
| CNFMNi | ZZZ |
| CNFMNk | LLL |
| ○ | ○ |
| ○ | ○ |
| ○ | ○ |
| ○ | ○ |
| ○ | ○ |
| CNFMNn | WWW |

500

DATA MESSAGE STORAGE AND PICK UP SERVICE

FIELD OF THE INVENTION

The invention relates to telecommunications networks and more particularly relates to storing a subscriber's data message in a telecommunications network for delivery to an intended caller.

BACKGROUND OF THE INVENTION

In a facsimile store and forward system, a subscriber may place a call thereto and enter the telephone number of a facsimile machine that is to receive a facsimile. The subscriber may then transmit the facsimile to the system, which stores the received facsimile in associated memory. Thereafter, the facsimile system places a telephone call to the receiving facsimile machine and transmits the subscriber's facsimile thereto. One aspect of such an arrangement is that the sender of a facsimile has to know the telephone number of the receiving facsimile machine. Disadvantageously, in certain situations it may be difficult to ascertain the telephone number of a facsimile machine associated with an intended recipient. This is especially true if the recipient happens to be traveling.

SUMMARY OF THE INVENTION

An advancement in the art of transmitting a data message to an intended recipient is achieved, in accord with an aspect of the invention, by accepting a data message from a sender, storing the data message in memory in association with a unique confirmation number that is not already stored in memory in association with any other stored data message and, thereafter, supplying the stored data message to a caller who enters the associated confirmation number. In accord with another aspect of the invention, the sender may specify the number of times that the data message may be accessed as long as each such access is associated with the entry of the aforementioned confirmation number. In accord with still another aspect of the invention, the sender may request that N different confirmation numbers be associated with the sender's data message, where $N>1$. Accordingly, N persons may access the sender's data message as long as they enter a respective one of the N different confirmation numbers when requested to do so.

DETAILED DESCRIPTION

Figure 1:
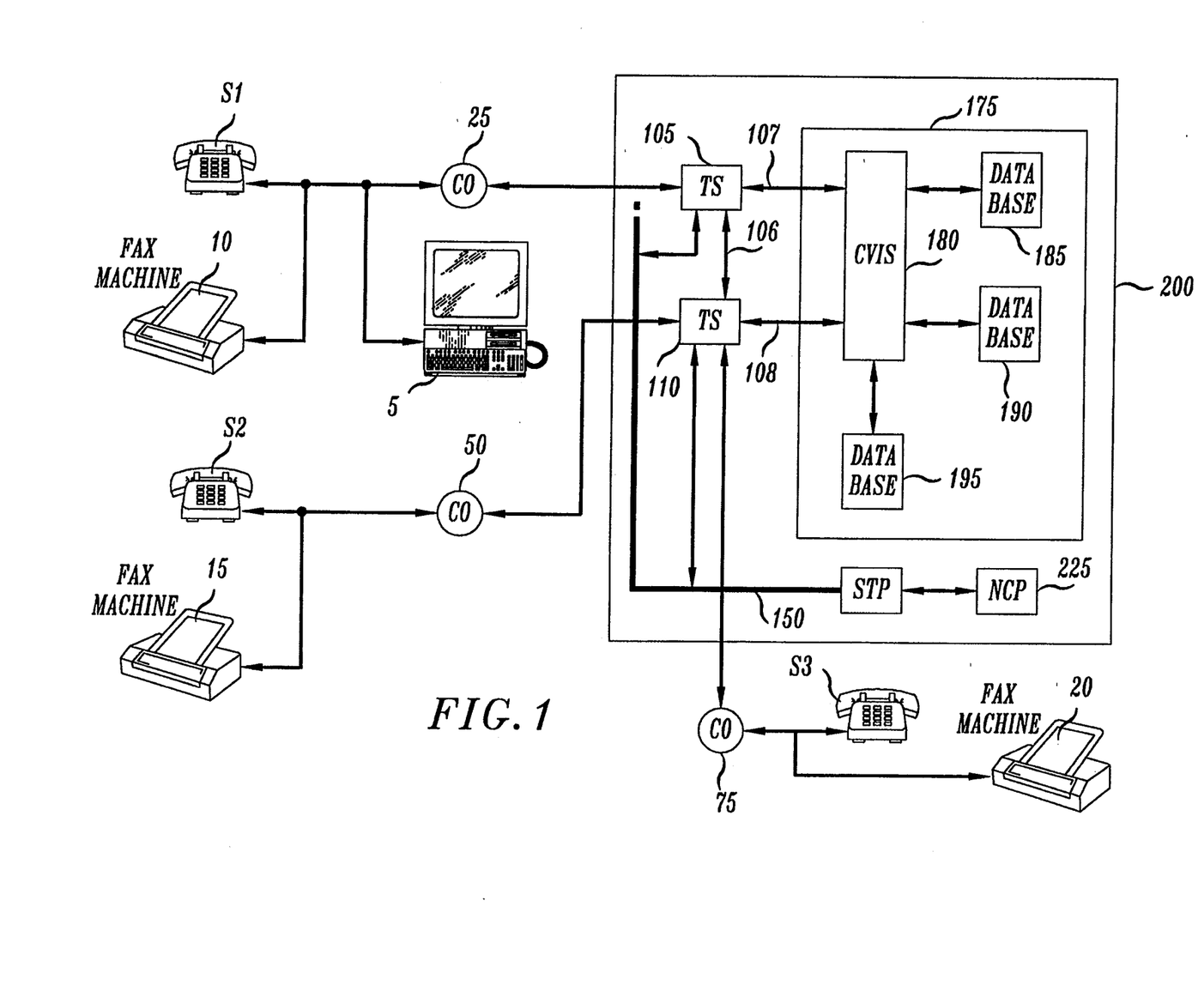
FIG. 1 is a broad block diagram of a telecommunications network in which the principles of the invention may be practiced.

Turning now to FIG. 1, there is shown telecommunications network 200, which may be, for example, the AT&T public switched network, that provides a number of different calling services for its subscribers, e.g., the subscribers associated with station sets S1, S2 and S3, respectively.

Network 200 includes, inter alia, a plurality of interconnected Toll Switching (TS) offices, two of which are shown in the FIG., namely TS 105 and 110. Such toll switches are also interconnected via the well-known Common Channel Signaling network (CCS) 150, which the toll switches use to exchange data messages with one another in order to establish a telephone connection from an originating toll switch, e.g., TS 105, to a destination toll switch, e.g., TS 110.

Each toll switch, e.g., TS 105, is also connected to one or more Central Offices (CO), such as CO 25. As is well-known, a CO is arranged to connect a calling telephone station (e.g., S1) which has dialed a particular telephone number outside of the calling area served by the CO to an associated toll switch, e.g., TS 105. A CO is also arranged to connect calls that it receives from an associated toll switch (destination switch) to a called station, e.g., station S1.

Network 200 further includes a number of centralized databases commonly referred to as Network Control Points (NCP), which support the provision of various network 200 services, such as the well-known 800 and 900 calling services. Such NCPs, for example, NCP 225, are interconnected with the toll switches via CCS network 150 and various signal transfer points, such as Signal Transfer Point (STP) 220. One function of an NCP is to translate a 800 or 900 service telephone number that it receives from an originating toll switch, e.g., TS 105, into a telephone number specified by the business customer associated with the 800 (900) service telephone number. The NCP then returns, inter alia, the translated telephone number and a routing number that may be used to identify a destination toll switch, e.g., TS 110, to which the 800 or 900 service call may be forwarded.

Network 200 also includes data message service 175 which implements, in accord with an aspect of the invention, a "hold for pickup" function in the delivery of a data message, e.g., a facsimile, data file or digitized image, to an intended recipient. Specifically, service 175 includes voice interactive system 180, which may be, for example, the Conversant TM (trademark of AT&T) voice interactive system (CVIS) available from AT&T, to present a voice interface to a caller. Service 175 also includes a number of databases 185, 190 and 195. Service 175, more particularly, stores a data message that it receives from a subscriber in database 185 for a predetermined period of time, e.g., one week. If a stored data message is not supplied to a caller within one week in the manner discussed below, then the data message is transferred to archive database 190. Database 195, on the other hand, is used for administrative purposes, as discussed below.

Figure 2:
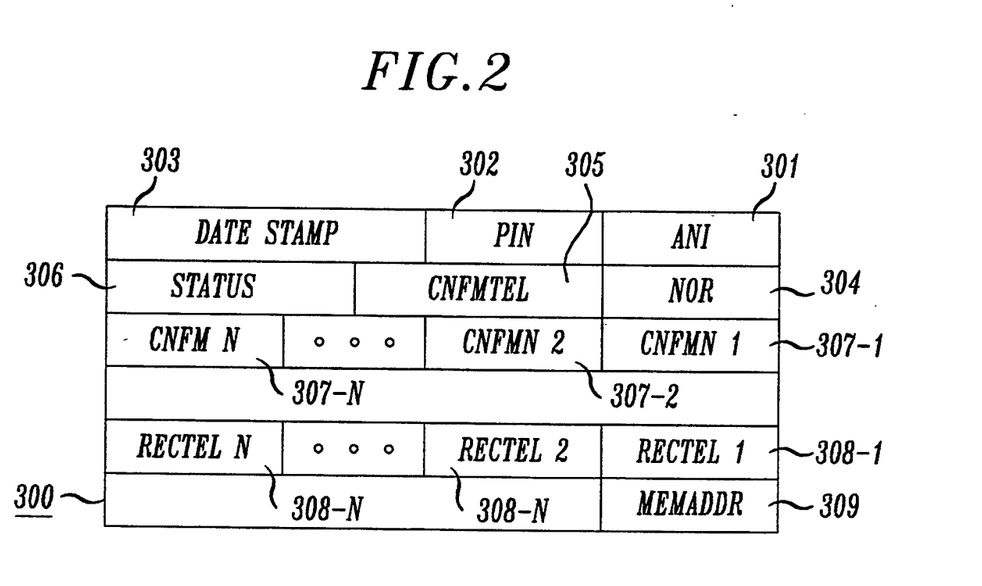
FIG. 2 is an illustrative example of a data record that is associated with a stored data message.

The storage of a data message in either database 185 or 190 is tracked using a data record that is created at the time the message is received from an associated subscriber. Service 175 stores the data record in database 195 and uses it to identify the memory location of a stored data message. A data record is also used for other reasons, as will be explained below. An example of such a data record is shown in FIG. 2, in which the value of a unique confirmation code associated with the stored message is entered in field 307-1. The memory location at which the data message is stored is entered in field 309. In accord with an aspect of the invention, the confirmation code, or number, is used to confirm that a caller is permitted to access the stored data message, as will be explained below in detail. Other information, or data, is entered in other fields of a data record. For example, the date and time that a data message is received from a subscriber is entered in field 303. The associated subscriber's telephone number (e.g., ANI), Personal Identification Number (PIN)), confirmation telephone number are entered in fields 301, 302, and 305, respectively. The number of recipients (NOR) that will be receiving the subscriber's data message is stored in field 304. In accord with an aspect of the invention, if the number of recipients is greater than one, then a confirmation number may be associated with each such recipient, in which the additional confirmation numbers are respectively entered in fields 307-2 through 307-N, as will be explained below. The telephone number of a caller who places a call to service 175 and who enters the confirmation number of the associated stored data message is entered in 308-1. If more than one caller receives a copy of the data message as indicated by the value entered in field 304, then the telephone numbers of those callers are stored in fields 308-2 through 308-N, respectively.

Figure 3:
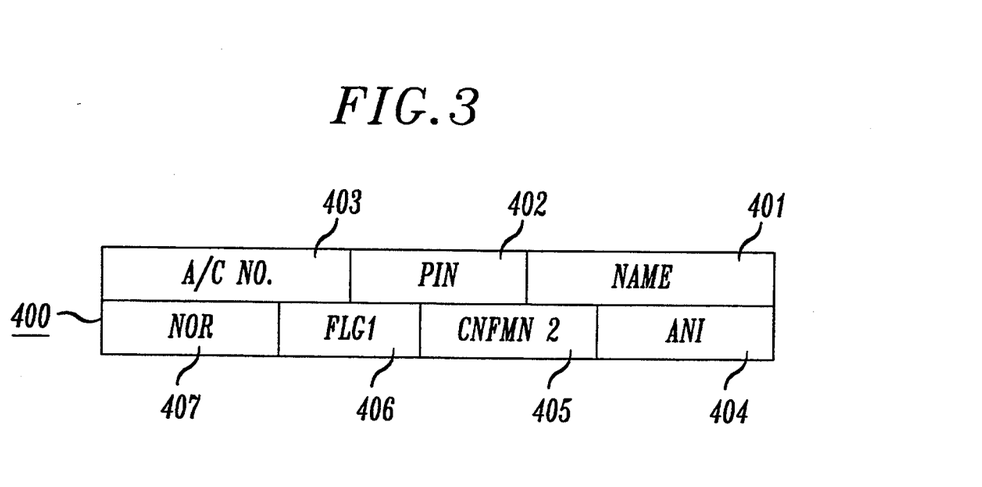
FIG. 3 is an illustrative example of a record that is associated with a respective subscriber of the inventive service.

A mentioned above, a PIN is stored in a data record associated with a stored data message. The PIN is also stored in a service 175 record associated with the subscriber. An example of a subscriber record is shown in FIG. 3, in which the subscriber's name, PIN and account number are respectively stored in fields 401 through 403 of the associated record 400. The subscriber's telephone number (ANI) is stored in field 404. A confirmation number (CNFMN) and an associated delayed entry flag (FLG1) are respectively entered in fields 405 and 406 when the associated subscriber delays the sending of a data message that will be identified by the number entered in field 405, as will be explained below.

As mentioned above, service 175 generates a unique confirmation number for each data message that it stores in its associated memory. In accord with an aspect of the invention, service 175 generates a random number of sufficient length, e.g., twelve digits, on the fly and uses that number as a confirmation number. The use of a random number as a confirmation number assures to a certain degree that the number will not be compromised by a fraudulent caller. As an aspect of the invention, service 175 may be arranged so that it varies the number of digits forming a confirmation number in which the variation is based on the level of traffic (i.e., number of data messages) that is handled by service 175 within a predetermined period of time, for example, one week. In this way, service 175 may generate a random number having 12 digits when the level of traffic is high and generate a random number having fewer digits (e.g., 10) when the level of traffic is moderate. As such, the number of digits forming a confirmation number may be a function of the number of data messages (traffic) processed by service 175.

As another aspect of the invention, service 175 may be further arranged so that the subscriber is provided with the option of entering his/her own confirmation number. If the subscriber elects to invoke that option, then service 175 associates entered number with the data message (e.g., facsimile) that the subscriber supplies to service 175 for storage therein. Otherwise, service 175 generates the confirmation number and supplies it to the subscriber.

With the foregoing in mind we now discuss the operation of service 175 in the context of (a) receiving a facsimile from a subscriber, (b) storing the facsimile in database 185 and (c) thereafter supplying the facsimile to a caller who enters (1) the associated confirmation number and (2) a telephone number of the caller's facsimile machine. In doing so, reference will be made to FIGS. 1, 3, 4 and 5. Specifically, assume that the subscriber associated with station S1 and Facsimile Machine (FM) 10 desires to send via service 175 a facsimile to the person associated with station set S2 and FM 15. To do so, the station S1 subscriber places a telephone call to service 175 by dialing a telephone number associated with service 175. Such a telephone number may be, for example, an 800 service number such as 1-800-send-fax. (In accord with an aspect of the invention, a person who does not subscribe to the data message service 175 may, nevertheless, take advantage of that service. In such a situation, the person may place a call to another service 175 number, e.g., a 900 service telephone number, that is reserved for casual users, as will be discussed below.)

When the station S1 subscriber dials the aforementioned 800 service number, then CO 50, operating in a conventional manner and in conjunction with network 200 (i.e., toll switch 105), forwards the call to an idle port of a group of service 175 port circuits associated with the called number. Such port circuits are represented in FIG. 1 by path 107. CVIS 180, responsive to receipt of the 800 service call (block 400), prompts the caller to enter a PIN (block 401, FIG. 4). When the caller does so, then CVIS 180 obtains the subscriber's service record from database 195. CVIS 180 then determines if the entered PIN is valid (block 402). If the entered PIN is not valid, then CVIS determines if the received entry represents the caller's second attempt to enter a valid PIN. If that is the case, then CVIS concludes that it ought to terminate the call (block 414) and proceeds to execute that function in a conventional manner (block 415). If CVIS determines that is not the case, then it reprompts the caller to enter a PIN (block 401) and then proceeds as discussed. Assuming that the entered PIN is valid, then CVIS 180 obtains a copy of the associated subscriber record and checks the contents of field 406 to see if it contains a delayed transmission flag (block 403). Assuming that is not the case, then CVIS 180 prompts (block 404) the subscriber (caller) to enter the number of recipients (NOR) that will be receiving the subscriber's facsimile. Assuming that the subscriber enters the digit one, then CVIS 180 enters that number in field 407 of the subscriber's associated record 400. CVIS 180 then generates a unique confirmation number and also enters it in the associated record 400 (block 405). (As mentioned above, the confirmation number may be entered by the subscriber, or caller.) CVIS 180 then sends (announces) the unique confirmation number in a voice format to the subscriber via path 107 (block 406). CVIS 180 then prompts the subscriber to transmit the facsimile (block 407). If the subscriber is not ready to transmit and, in response to the latter prompt, enters a predetermined character, e.g., the pound (#) sign, then CVIS 180 enters a delayed transmission flag in field 406 of the subscriber's record 400

Figure 4:
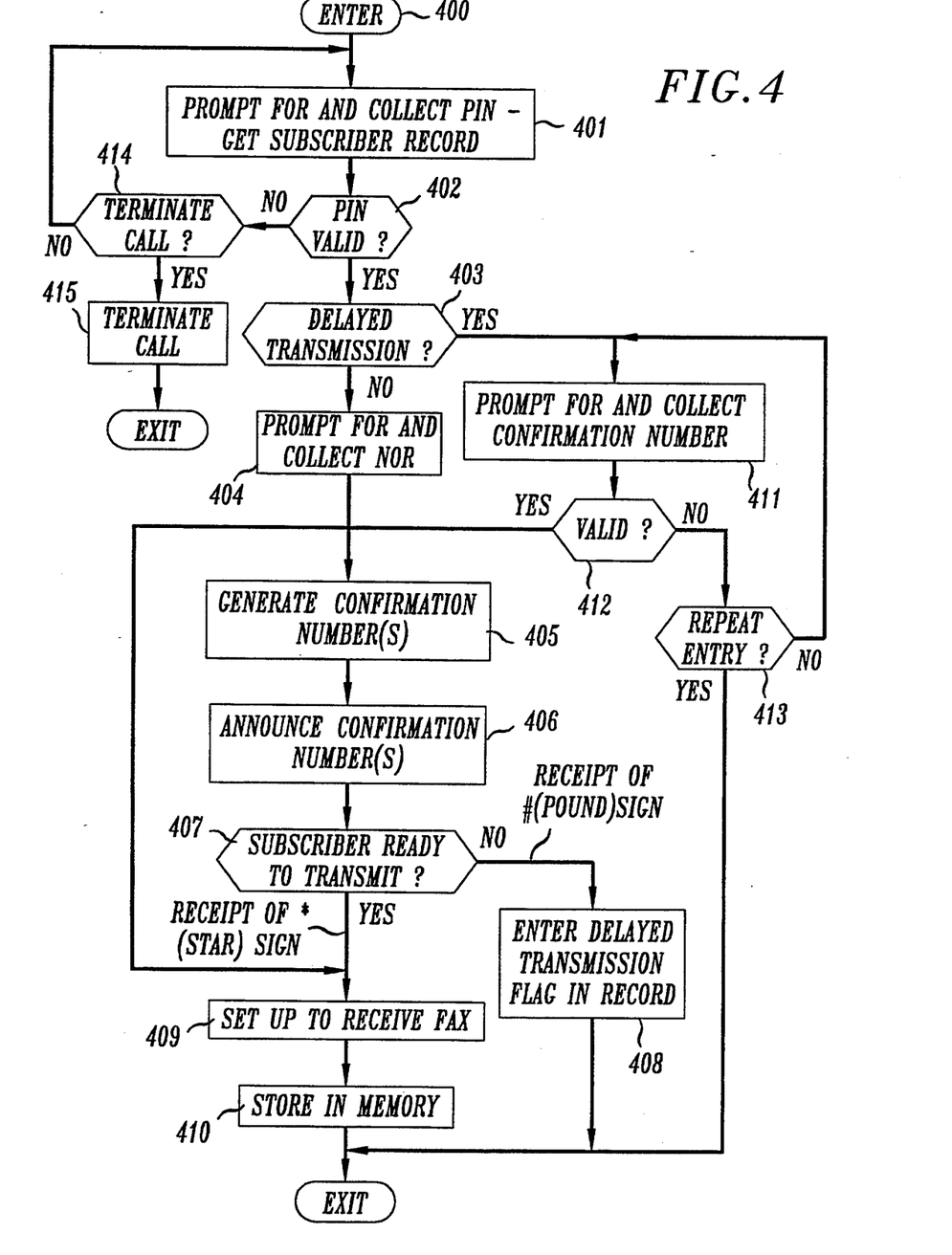
FIGS. 4–6 illustrate in flow chart form the program which implements the invention in service 175 of FIG. 1.

(block 408). At this point, the subscriber may terminate the connection by "hanging up." Thereafter, when the subscriber places a call to service 175, CVIS 180 will find that the subscriber's record contains a delayed transmission flag (block 403). As such, CVIS 180, responsive to receipt of the subscriber's PIN, then prompts the subscriber to determine if the transaction relates to the delayed transmission of a facsimile. If that is the case, then CVIS prompts the subscriber to enter the confirmation number of the facsimile that CVIS 180 previously sent to the subscriber (block 411). Upon receipt of the latter number CVIS 180 compares that number with the confirmation number that was entered previously in the subscriber's record (block 412). If the comparison turns out to be true, then CVIS 180 prompts the subscriber to begin the transmission of the facsimile by returning a conventional facsimile carrier tone.

If the comparison fails, then CVIS 180 again prompts the subscriber to enter the confirmation number and re-executes the comparison function upon receipt thereof. If the latter comparison also fails, (block 413) then CVIS 180 terminates the connection.

If in the above case the subscriber is ready to transmit the facsimile and enters a predetermined character, e.g., the star (*) sign, in response to the CVIS 180 prompt, then CVIS 180 returns facsimile carrier tone to indicate that it is ready to receive the facsimile. At that point the station S1 subscriber may, in a conventional manner, switch the telephone connection from station S1 to FM 10. FM 10 responsive to the carrier tone exchanges signals with service 174 to negotiate (block 409) a transmission mode with service 175, as is done in a conventional manner. When the transmission mode has been so negotiated then FM 10 begins transmitting the subscriber's facsimile.

Figure 7:
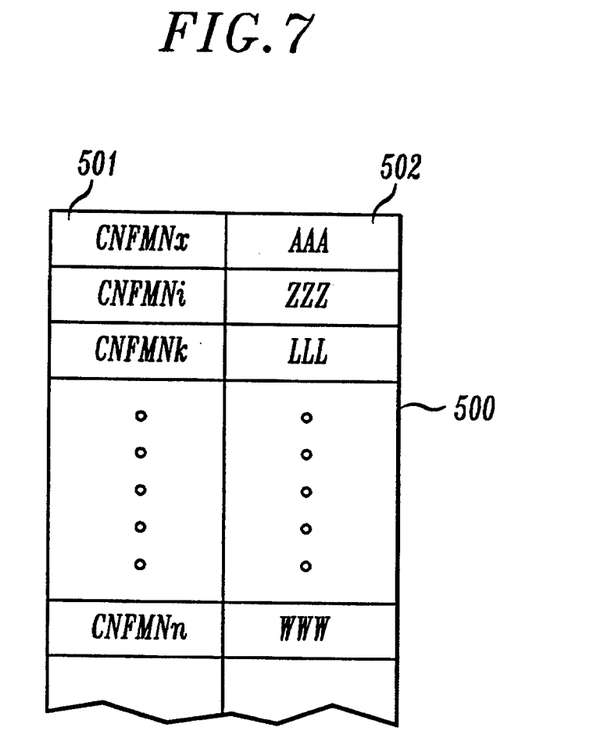
FIG. 7 is an illustrative example of a table that is used to locate the memory location at which a particular data message is stored.

CVIS 180 responsive to receipt of the facsimile stores it in database 185 (block 410). In doing so, CVIS 180 creates a data record 300 (discussed above in connection with FIG. 2) associated with the received facsimile. In addition, CVIS 180 stores the associated confirmation number and database 195 memory address at which the associated data record 300 is stored in a list. An example of such a list, which is also stored in database 195, is shown in FIG. 7. In particular, each line of list 500 includes a confirmation number, e.g., CNFNx, in column 501 and an associated memory (185 or 190) address, e.g., as represented by AAA, ZZZ, etc., in column 502.

Returning to FIG. 1, CVIS 180 also enters in the associated data record 300 (a) a time and date stamp (b) the number of callers that will receive the subscriber's facsimile, (c) subscriber's PIN, and (d) confirmation telephone number, as discussed above.

Following the transmission of the facsimile, the station S1 subscriber may then place a call to the intended recipient of the facsimile, e.g., a person associated with station S2, and supply the facsimile confirmation number to that person. The station S2 caller may then retrieve the facsimile from service 175 by placing a call to service 175 using a particular telephone number, e.g., a second 800 service telephone number such as 1-800-geta-fax. When the station S2 caller does so, CO 75 operating in conjunction with toll switch 110 forwards the call to an idle port circuit of a group of service 175 port circuits associated with the latter telephone number. The latter group of port circuits are represented in FIG. 1 by path 108. CVIS 180, responsive to receipt of the incoming call (block 500, FIG. 5) via path 108, prompts the caller to enter a facsimile confirmation number (block 501). When the station S2 caller does so, CVIS 180 checks (block 502) the entered number to determine if it is stored in the aforementioned list 500 (FIG. 8) of confirmation numbers. If the entered confirmation is not valid, then CVIS 180 again prompts the caller to enter a confirmation number. If the latter entry if again found to be invalid (blocks 502 and 507) then CVIS 180 terminates the call (block 506). If the entered confirmation number is valid, then CVIS 180 uses the database 195 address associated with the confirmation number in list 500 to unload the associated facsimile data record from database 195. CVIS 180 then prompts (block 504) the caller to enter the telephone number of the facsimile machine that will receive the facsimile. When the caller does so, CVIS 180 stores the entered telephone number, e.g., telephone number of FM 10, in the associated facsimile data record, as discussed above. CVIS 180 then announces (block 505) that the facsimile will be transmitted to that telephone number and terminates (block 506) the telephone connection.

Following the foregoing, CVIS 180 (block 600, FIG. 6) accesses one of its idle port circuits and places a call (block 601) to the entered telephone number, i.e., facsimile machine 15. FM 15 in a conventional manner answers the incoming call by returning the aforementioned carrier tone. At that point, CVIS 180 and FM 15 exchange signals to establish a mutually agreeable facsimile transmission mode (blocks 602, 603 and 604), as mentioned above. When a proper mode is established, then CVIS 180 transmits the facsimile (block 605) associated with the received confirmation number. CVIS 180 then decrements (block 606) the contents of field 304 of the associated record 300. If the resulting value of such contents turns out to be zero (block 607), then CVIS 180 erases (block 608) the facsimile confirmation number and associated database 195 address from list 500 as a way of noting that the facsimile has been transmitted to the intended recipient. If the value of NOR is greater than zero, then CVIS 180 terminates the call (block 612) without performing the aforementioned erasing function.

Figure 6:
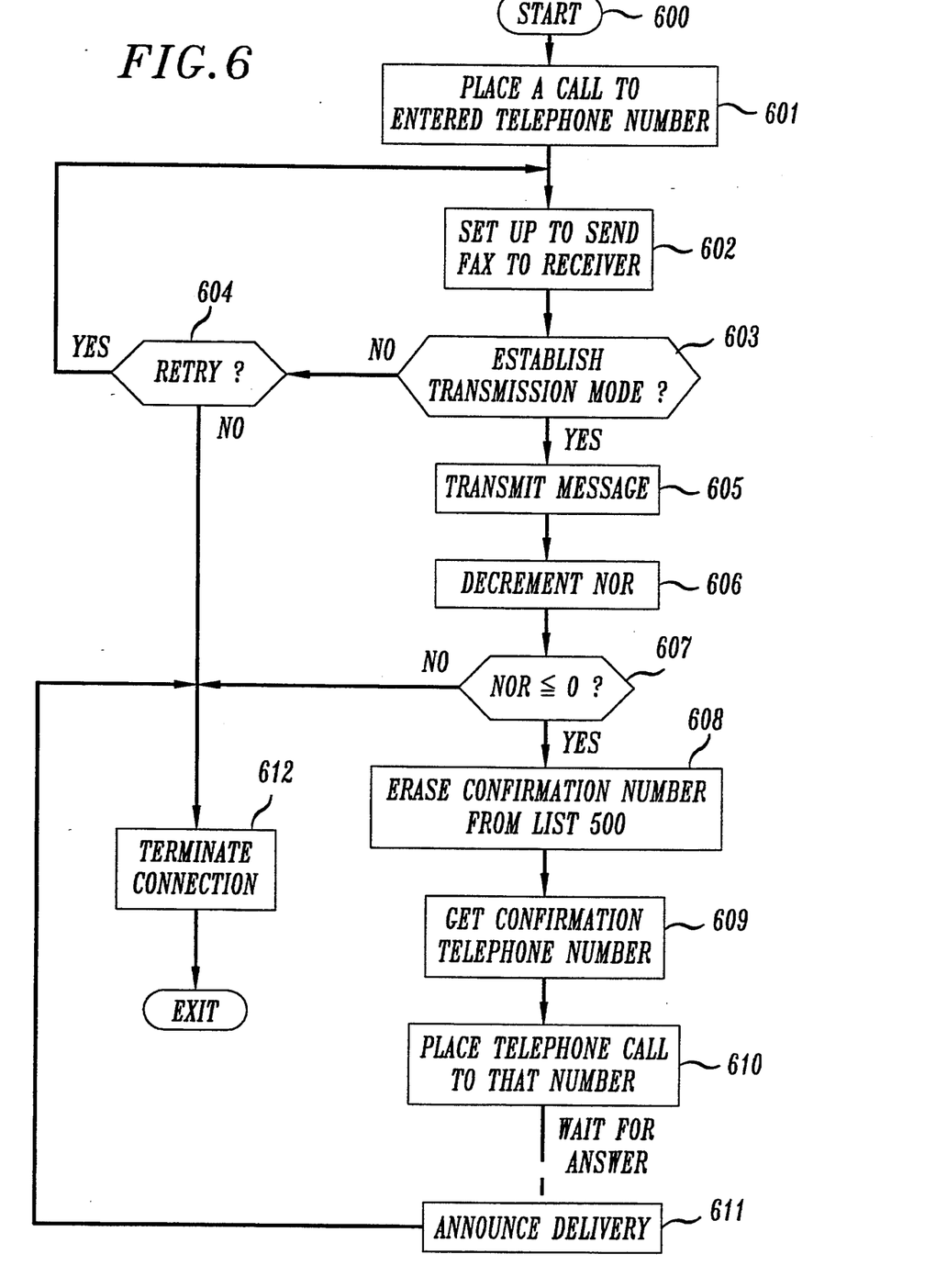

When the subscriber's facsimile has been delivered to the station S2 caller, CVIS 180 may then confirm delivery of the facsimile to the station S1 subscriber. To do so, CVIS 180 unloads (block 609) the confirmation telephone number from the data record associated with the delivered facsimile and places a telephone call thereto (block 610). When the call is answered, CVIS 180 transmits a voice announcement (block 611) indicating that the facsimile associated with confirmation number xxxxxx has been delivered, where xxxxxx represents the first n digits of the facsimile confirmation number. Alternatively, the subscriber may dial a telephone number, e.g., 1-800-chek-fax, associated with service 175 to determine the status of a particular facsimile. Specifically, if the station S1 subscriber dials that telephone number, then a telephone call is presented to CVIS 180 via a telephone connection including CO 25, TS 105, and a particular path 107 telephone circuit. CVIS 180, responsive to receipt of the call via that circuit, prompts the caller to enter his/her PIN. If the PIN is valid, then CVIS 180 prompts the caller to enter the first n digits, e.g., six digits, of the confirmation number of the pertinent facsimile. When the subscriber does so, then CVIS 180 announces the status of the associated facsimile, i.e., whether or not the facsimile has been retrieved by a recipient. CVIS 180 may then repeat the above prompt to allow the subscriber to ascertain the status of another facsimile associated with the subscriber.

If in the above example, the station S1 subscriber indicates that the facsimile is to be delivered to n, e.g., two, recipients, then CVIS 180 saves that number for entry in field 304 of the associated facsimile data record 300 (FIG. 2). In addition, CVIS 180 prompts the subscriber to determine if a facsimile confirmation number is to be generated for each recipient. If the station S1 subscriber responds negatively, then CVIS generates just one confirmation number and stores the number in the manner described above. Accordingly, when a caller, e.g., the station S2 caller, places a call to service 175 for the purpose of obtaining a copy of the facsimile, then CVIS 180, upon obtaining the facsimile record, checks the value contained in field 304 to see if it is greater than zero. If it is, then CVIS 180 sends a copy of the associated facsimile to the caller in the manner described above. CVIS 180 then decrements the value stored in field 304 of record 300, as mentioned above, and does so each time a caller obtains a copy of the associated facsimile. When that value reaches zero, then CVIS 180 places a call to the subscriber to confirm delivery of the facsimile, as described above. In this way, CVIS 180 prevents the sending of a copy of the facsimile to another caller, even though the caller enters the correct confirmation number associated with the facsimile.

If the station S1 subscriber desires a confirmation number for each recipient and thus responds affirmatively to the above-mentioned prompt, then CVIS 180 generates n confirmation numbers (blocks 405 and 406, FIG. 4) and transmits them as they are generated to the station S1 subscriber. In addition, CVIS 180 enters each such confirmation number in list 500 in association with the database 195 memory address that will be assigned to the associated data message record 300. CVIS will also store the confirmation numbers in respective ones of fields 307-1 through 307-N of the associated record 300. Thereafter, when the stored facsimile is delivered to a recipient, e.g., the station S2 caller, CVIS 180 decrements the value contained in field 304 of the associated data record 300, as mentioned above. CVIS 180 also erases the confirmation number that the caller entered from list 500 so that the number cannot be used to obtain another copy of the facsimile. As discussed above, the delivery of the associated facsimile will thus be terminated when the value in field 304 of the associated record 300 reaches zero, at which time the last of the confirmation numbers generated for the facsimile should have been removed from list 500.

Figure 5:
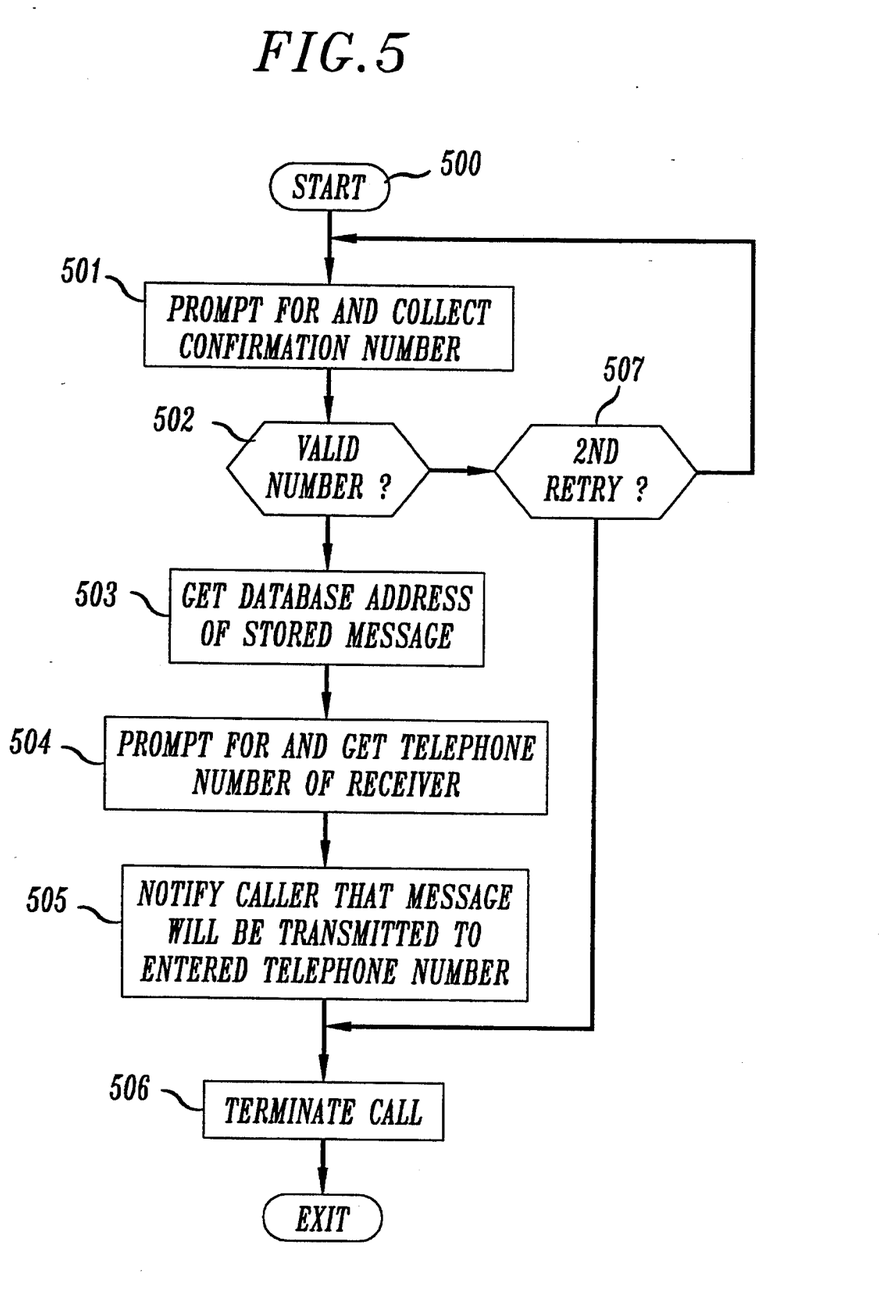

CVIS 180, in accord with a feature of the invention, terminates a call when the caller fails to enter a valid confirmation number on the second try (block 507, FIG. 5). In addition, CVIS 180 associates the calling number associated with the unsuccessful attempt to enter a valid confirmation number with the current date and time and stores the result in a particular list (not shown). CVIS 180 then scans the list to determine if the latter telephone number is already contained in the list. If it is, then CVIS assembles all entries of the telephone number in the list. If the number of such entries for a particular duration of time, e.g., 24 hours, exceeds a predetermined threshold, e.g., a value of ten, then CVIS 180 (a) notifies a service 175 administrator thereof and (b) blocks all calls originating from that telephone number from accessing service 175. Alternatively, rather than blocking such calls, service 175 may be arranged so that it increases exponentially its response time in the processing of a call associated with such a telephone number and/or invalid confirmation number each time a call from that telephone number is received at service 175. In this way a so-called "hacker" who is attempting to gain access to a particular facsimile will be frustrated by the ever-increasing CVIS 180 response time to the "hacker"s" calls and/or inquiries.

As an aspect of the invention, the services provided by service 175 may be offered to a nonsubscriber ("casual user"). In particular, a casual user may place a call to service 175 by dialing a particular telephone number, e.g., a 900 service number such as 1-900-send-fax, which identifies the status of the caller as being a casual user. If a caller, e.g., the caller associated with station S3 (FIG. 1 ), dials that telephone number, then CO 75 operating in conjunction with toll switch 110 forwards the call to an idle port circuit of a group of service 175 port circuits associated with the dialed telephone number. The latter group of port circuits is represented in FIG. 1 by path 108. In response to a call received over that port, CVIS 180 proceeds as though the call originated from a subscriber as discussed above. However, in this instance, CIVS 180 creates a billing record containing the (a) dialed telephone number, (b) callers ANI, and (c) date and starting time of the transaction. CVIS 180 then proceeds in the manner discussed above in order to receive the casual user's facsimile. When CVIS 180 completes the transaction, it then enters the date and ending time of the transaction in the billing record. Such a billing record is thereafter supplied to a centralized billing center which generates a "telephone bill" for the use of service 175 by the station S3 casual user.

In the event that a casual user subscribes to a service which blocks the placing of a 900 call via that user's telephone station set, then the user may place a call to service 175 using an alternate telephone number, for example, 1-800-paya-fax. However, in this instance the cost of the transaction is billed directly to the caller's credit or calling card. As such, when such a call arrives at service 175 via a respective telephone connection (represented in FIG. 1 by path 108), CVIS 180 prompts the caller to enter his/her credit, or calling, card number. Upon receipt of the number, CVIS 180 then sends the number via a direct telephone connection to a credit card validation bureau (not shown) for validation. The bureau, in turn, returns an answer indicating whether or not the entered number is valid. If it is, then CVIS 180 proceeds as discussed above, except that it charges the cost of the transaction to the entered credit/calling card number. If the entered number is not valid, then CVIS 180 announces that fact and terminates the call.

It can be appreciated from the foregoing that service 175 may be readily adapted to provide a "hold-for-pickup" service for data files. In this arrangement, a subscriber or casual user may transmit a data file to service 175 via an associated data terminal, e.g., terminal 5 (FIG. 1) having telephone capabilities. Similarly, a caller may access the file and have it downloaded from service 175 to the caller's data terminal by entering a confirmation identifier, e.g., a number, associated with the sought-after data file. Such a service may be readily implemented in service 175 by replacing CVIS 180 with a host computer, such as, for example, a model 3450 computer available from the NCR corporation. In such an implementation, the host computer transmits prompts for display on the display of the subscriber's (casual user's) data terminal. The subscriber, in turn, enters an appropriate response (e.g., PIN) via the keyboard associated with the terminal.

The foregoing is merely illustrative of the principles of the invention. Those skilled in the an will be able to devise numerous arrangements, which, although not explicitly shown or described herein, nevertheless embody those principles that are within the spirit and scope of the invention. For example, CVIS 180 may be arranged to deliver a confirmation number to a recipient or to a recipient's voice mail box or pager. CVIS 180 may be further arranged so that after it verbally supplies a confirmation number to the subscriber it then prompts the subscriber to repeat the number in a conventional manner, i.e., by pressing respective station set keypad numbers. As another example, service 175 may be arranged so that it delivers automatically a stored data message to intended recipients via electronic mail. Further, service 175 may be arranged so that it receives a data message via electronic mail, returns a confirmation number to the subscriber via that media and delivers the data message via facsimile. In addition, although the invention was discussed in terms of being deployed in a network, it may be advantageous in certain situations to deploy the inventive service in association with so-called customer premises equipment, e.g., a private branch exchange, or an adjunct associated with a facsimile machine. As another example, service 175 may be arranged so that it also confirms the nondelivery of a subscriber's facsimile. For example, if the facsimile is not delivered within a predetermined period of time, e.g., one day or a period set by the subscriber, then service 175 places a call to the subscriber and announces such nondelivery. As another example, CVIS 180 may be arranged to include voice recognition capability so that CVIS 180 may recognize a caller's/subscriber's verbal inquiry or response, such as a caller's spoken credit card number.

We claim:

1. A method of providing a data message delivery service in a telecommunications network comprising the steps of responsive to receipt of a call from a subscriber of said delivery service and desiring to send a data message to an intended recipient, generating a unique identifier and supplying the identifier to the subscriber, said identifier being other than an address of a memory location, responsive to receipt of said data message from said subscriber, storing said data message in memory in association with said unique identifier not then stored in memory in association with any other stored message, and responsive to receipt of said unique identifier entered by a subsequent caller unloading said data message and supplying it to said subsequent caller via said network.

2. The method set forth in claim 1 further comprising the step of responsive to supplying said data message to said subsequent caller, placing a telephone call to said first mentioned caller and announcing that said data message has been delivered to said subsequent caller.

3. The method set forth in claim 2 wherein said announcing includes identifying the confirmation code associated with said delivered data message.

4. The method set forth in claim 1 further comprising the step of responsive to a receipt of a subsequent call from said first mentioned caller and receipt of said unique confirmation code entered by said first mentioned caller, for supplying to said first mentioned caller information indicative of whether or not the associated data message has been supplied to said subsequent caller.

5. A method of providing a data message delivery service in a telecommunications network comprising the steps of storing a plurality of messages in memory in association with respective confirmation codes, responsive thereafter to receipt of a data message entered by a caller, storing said data message in memory in association with a unique confirmation code different from any one of said stored confirmation codes and supplying said unique confirmation code to said caller, said confirmation code being other than an address of a memory location, thereafter responsive to receipt of a call from a subsequent caller, prompting said subsequent caller to enter a confirmation code, and responsive to receiving said unique confirmation code from said subsequent caller, supplying said associated data message to said subsequent caller.

6. The method set forth in claim 5 further comprising the step of receiving said unique confirmation code from said first mentioned caller via said communications network.

7. The method set forth in claim 5 wherein said subsequent caller is one of a plurality of subsequent callers each having access to said unique confirmation code, said method further comprising the steps of prompting said first mentioned caller to enter the number of recipients of said data message, and supplying said data message to only a like number of said subsequent callers who enter said unique confirmation code.

8. The method set forth in claim 5 wherein said subsequent caller is one of a plurality of subsequent callers, said method further comprising the steps of prompting said first mentioned caller to enter the number of recipients of said data message, supplying to said first mentioned caller a plurality of unique confirmation codes, said plurality being equal to said number of recipients, and supplying said data message to respective ones of said subsequent callers who enter a respective one of said plurality of confirmation codes.

9. A method of providing a data message delivery service in a telecommunications network comprising the step of storing a plurality of messages in memory in association with respective confirmation codes, responsive thereafter to receipt of a data message entered by a caller, storing said data message in memory in association with a unique confirmation code different from any one of said stored confirmation codes and supplying said unique confirmation code to said caller, thereafter responsive to receipt of a civil from a subsequent caller, prompting said subsequent caller to enter a confirmation code, and responsive to receiving said unique confirmation code from said subsequent caller, supplying said associated data message to said subsequent caller, wherein said confirmation code is a variable-length sequence of digits, said length being based on the number of calls being processed by said service within a predetermined period of time.

10. A method of providing a data message delivery service in a telecommunications network comprising the steps of responsive to receipt of a first call from a first caller, supplying a unique confirmation code to said first caller and requesting said caller to enter an associated data message, said confirmation code being other than an address of a memory location, responsive to receipt of said data message from said first caller, storing said data message in memory in association with said unique confirmation code, said first caller thereafter supplying said confirmation code to a potential second caller, thereafter responsive to receipt of a call from said second caller, prompting said second caller to enter said confirmation code, and responsive to receiving said unique confirmation code from said second caller, supplying said data message to said second caller.

11. The method set forth in claim 10 wherein said data message is a facsimile.

12. The method set forth in claim 10 wherein said data message is a data file.

13. The method set forth in claim 12 wherein said data file characterizes an image.

14. The method set forth in claim 10 wherein said first caller is a subscriber of said service and said second caller is a nonsubscriber of said service.

15. The method set forth in claim 10 wherein said first caller is a nonsubscriber of said service and said second caller is a subscriber of said service.

16. The method set forth in claim 10 wherein said first call is associated with a first called telephone number when said first caller is a subscriber of said service and is associated with a second called telephone number when said first caller is a nonsubscriber of said service.

17. The method set forth in claim 16 wherein a call associated with said first called telephone number is billed to said first caller using a first billing arrangement and a call associated with said second called number is billed to said first caller using a second billing arrangement.

18. The method set forth in claim 10 wherein said first and second callers are nonsubscribers of said service.

19. The method said forth in claim 10 wherein the step of associating include the step of storing said data message in a first database, and transferring said data message from said first database to a second database in the event that said data message is not supplied to said second caller within a predetermined period of time starting from the storing of said data message in said first database.

20. The method set forth in claim 10 wherein said second caller is one of a plurality of second callers each having access to said unique confirmation code, said method further comprising the steps of prompting said first caller to enter the number of recipients of said data message, and supplying said data message to only a like number of said second callers who enter said unique confirmation code.

21. The method set forth in claim 10 wherein said second caller is one of plurality of second callers, said method further comprising the steps of prompting said first caller to enter the number of recipients of said data message, supplying a plurality of unique confirmation codes to said first caller, said plurality being equal to the number entered by first caller, and supplying said data message to respective ones of said second callers who enter respective ones of said plurality of confirmation codes.

22. The method set forth in claim 10 further comprising the step of responsive to supplying said data message to said second caller, placing a telephone call to said first caller and announcing the delivery of said data message to said second caller.

23. The method set forth in claim 22 wherein said announcing includes identifying the confirmation code associated with said delivered data message.

24. The method set forth in claim 10 further comprising the step of responsive to receipt of a subsequent call from said first caller and receipt of said unique confirmation code entered by said first caller, then supplying information indicative of whether or not the associated data message has been supplied to said second caller.

25. A method of providing a data message delivery service in a telecommunications network comprising the steps of responsive to receipt of a first call from a first caller, supplying a unique confirmation code to said first caller and requesting said caller to enter an associated data message, responsive to receipt of said data message from said first caller, storing said data message in memory in association with said unique confirmation code, said first caller thereafter supplying said confirmation code to a potential second caller, thereafter responsive to receipt of a call from said second caller, prompting said second caller to enter said confirmation coder and responsive to receiving said unique confirmation code from said second caller, supplying said data message to said second caller, wherein said confirmation code is a variable-length sequence of digits, said length being based on the number of calls processed by said service within a predetermined period of time.

26. A method of providing a message delivery service in a telecommunications network, said method comprising the steps of responsive to receipt of a call from a first caller desiring to send a data message to an intended recipient, generating a unique identifier and supplying the identifier to the first caller via said network, said identifier being other than an address of a memory location.

responsive to receipt of a data message entered by said first caller via said network, storing said data message in memory in association with said unique identifier, and thereafter responsive to receipt of a telephone call from a second caller other than said first caller, supplying said data message to said second caller if said second caller enters said unique identifier when requested to do so.

27. The method set forth in claim 26 wherein said data message is a facsimile.

28. The method set forth in claim 26 wherein said data message characterizes a data file.

29. The method set forth in claim 28 wherein said data file characterizes an image.

30. The method set forth in claim 26 further comprising the step of receiving said unique identifier from said first caller.

31. The method set forth in claim 26 wherein said first caller is a subscriber of said service and said second caller is a nonsubscriber of said service.

32. The method set forth in claim 26 wherein said first caller is a nonsubscriber of said service and said second caller is a subscriber of said service.

33. The method set forth in claim 26 wherein said first call is associated with a first called telephone number when said first caller is a subscriber of said service and is associated with a second called telephone number when said first caller is nonsubscriber of said service.

34. The method set forth in claim 33 wherein a call associated with said first called telephone number is billed to said first caller using a first billing arrangement and a call associated with said second called number is billed to said first caller using a second billing arrangement.

35. The method set forth in claim 26 wherein said first and second callers are nonsubscribers of said service.

36. The method said forth in claim 26 wherein the step of associating include the step of storing said data message in a first database, and transferring said data message from said first database to second, archive database in the event that said data message is not supplied to said second caller within a predetermined period of time starting from the storing of said data message in said first database.

37. The method set forth in claim 26 wherein said second caller is one of plurality of second callers each having access to said unique confirmation code, said method further comprising the steps of prompting said first caller to enter the number of recipients of said data message, and supplying said data message to only a like number of said second callers.

38. The method set forth in claim 26 wherein said second caller is one of plurality of second callers, said method further comprising the steps of prompting said first caller to enter the number of recipients of said data message, generating and supplying to said first caller a plurality of unique confirmation codes, said plurality being equal to said number of recipients, and supplying said data message to respective ones of said second callers who are the first to enter one of said plurality of confirmation codes.

39. The method set forth in claim 26 further comprising the step of responsive to supplying said data message to said second caller, placing a telephone call to said first caller and announcing the delivery of said data message to said second caller.

40. The method set forth in claim 39 wherein said announcing includes identifying the confirmation code associated with said delivered data message.

41. A method of providing a message delivery service in a telecommunications network, said method comprising the steps of responsive to receipt of a data message entered by a said first caller via said network, storing said data message in memory in association with said unique identifier, and thereafter responsive to receipt of a telephone call from a second caller other than said first caller, supplying said data message to said second caller if said second caller enters said unique identifier when requested to do so, wherein said confirmation code is a variable-length sequence of digits, said length being based on the number of calls processed by said service within a predetermined period of time.

* * * * *